United States Patent [19]

Eisele et al.

[11] 4,038,229

[45] July 26, 1977

[54] PROCESS FOR THE MANUFACTURE OF IMPREGNATING MELAMINE RESINS

[75] Inventors: Wolfgang Eisele; Ludwig Lelgemann; Bernhard Magerkurth, all of Ludwigshafen; Harro Petersen, Frankenthal, all of Germany

[73] Assignee: Badische Anilin- & Soda-Fabrik Aktiengesellschaft, Ludwigshafen (Rhine), Germany

[21] Appl. No.: 586,424

[22] Filed: June 12, 1975

Related U.S. Application Data

[63] Continuation of Ser. No. 353,484, April 23, 1973, abandoned.

[51] Int. Cl.² ............................................. C08L 61/28
[52] U.S. Cl. ........................ 260/29.4 R; 260/32.6 N; 260/67.6 R; 428/528; 428/530
[58] Field of Search ............... 260/67.6 R, 29.4 R, 260/32.6 N

[56] References Cited

U.S. PATENT DOCUMENTS

| | | | |
|---|---|---|---|
| 2,327,772 | 8/1943 | D'Alelio | 260/67.6 R |
| 2,916,410 | 12/1959 | Fraser et al. | 260/29.4 R |
| 3,539,485 | 11/1970 | Gress et al. | 260/29.4 UA |
| 3,753,934 | 8/1973 | Diethelm et al. | 260/67.6 R |

FOREIGN PATENT DOCUMENTS

| | | |
|---|---|---|
| 1,591,960 | 6/1970 | France |
| 2,048,809 | 5/1971 | Germany |

*Primary Examiner*—Howard E. Schain
*Assistant Examiner*—W. C. Danison, Jr.
*Attorney, Agent, or Firm*—Keil, Thompson & Shurtleff

[57] ABSTRACT

Aqueous impregnating resins based on a condensate of melamine and formaldehyde containing a lower fatty acid dialkyl amide such as dimethyl acetamide either in solution or as part of the condensate, and a process for the manufacture thereof.

6 Claims, No Drawings

PROCESS FOR THE MANUFACTURE OF IMPREGNATING MELAMINE RESINS

This application is a contination application under 37 CFR 1.60 of co-pending application Ser. No. 3,53,484 filed Apr. 23, 1973 which application has now been abandoned.

This invention relates to the addition of elastifying agents to thermocurable melamine/formaldehyde precondensates to improve their flow during curing and to reduce the brittleness of the cured condensates.

Aqueous or aqueous/alcoholic solutions of melamine/formaldehyde precondensates, referred to below as impregnating melamine resins or simply as melamine resins, are suitable for impregnating absorbant carrier materials such as paper and non-woven or woven fabrics which, after drying, are processed into laminates by hotpress techniques or are used for improving the surface of wood materials such as fiberboard and chipboard. In this way it is possible to produce hard surfaces of excellent brilliance and clarity of color, which are mar-resistant and resistant to water and chemicals. Such surfaces are particularly desirable for furniture. Melamine-resin-bonded surface coatings, for example on worktops for kitchen and canteen use, etc., are still known simply as "plastics surfaces".

However, carrier materials impregnated ith pure melamine resins are very difficult to process, particularly in the case of surface treatment of wood materials of relatively low density such as chipboard. Although the resins may be shaped thermoplastically, their flow is often insufficient at the low pressures of up to 20 kg/cm² which are permissible when pressing the assembly, and the result is an uneven surface containing a large number of pores and thus prone to crack formation when it is subsequently subjected to thermal stresses. It has been proposed to improve the flow of melamine resins by adding toluenesulfonamide, lactams, polyhydric alcohols, acetals and the like. The flowability of the resin clearly depends on other factors also, such as its degree of condensation, the type of carrier material used, the conditions of processing, etc.

On account of the large number of different factors affecting the flowability of melamine resins, it is desirable to produce new agents for improving the impregnating properties of resin solutions, the flowability of melamine resins and the goss, hardness, resistance to water, cheicals and heat and other properties of surface coatings processed with said melamine resins, including the number of pores therein.

It is an object of the invention to provide novel ipregnating resins and a process for their manufacture, with which the aforementioned improvements may be achieved.

It is a further object of the invention to provide an additive for conventional melamine/formaldehyde impregnating resins, by means of which new and unexpected properties may be achieved in the resin compositions thus modified.

We have found that these and other results and advantages are obtained when melamine and formaldehyde are condensed in known manner at a molar ratio of from 1:16 to 1:6 in aqueous solution, with or without the addition of conventional agents in minor quantities, and adding, before, during or after condensation, from 1 to 20% and preferably from 3 to 10%, by weight, based on the content of melamine/formaldehyde precondensate in the aqueous solution, of a fatty acid dialkyl amide which is soluble in the aqueous resin solution and which has the general formula:

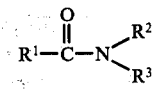

where $R^1$ is hydrogen or lower alkyl preferably of from 1 to 4 carbon atoms and $R^2$ and $R^3$ are alkyl of from 1 to 4 carbon atoms.

One characteristic feature of the acid amides used in accordance with the invention is there solubility in water or aqueous melamine resin solution. This solubility should be at least such as to allow the addition to the resin solution of from 1 to 20% by weight (based on the resin content of the solution) of the acid amide derivative in dissolved form. Suitable melanime/formaldehyde precondensate solutions which may be mixed with said amides at any stage of the polycondensation are manufactured by conventional methods as described, for example, in Ullmann's Enzyklopaedie der technischen Chemie, Vol. 3, 3rd Edition, pp. 485 to 492, at a molar ratio of melamine to formaldehyde of from 1:16 to 1:6 and in particular from 1:16 to 1:3 and at a pH of from 7 to 10 and temperatures of from 60° to 100° C.

The reaction mixture or the fully condensed resin solution may contain, in addition to melamine and formaldehyde, minor quantities, e.g. 20%, of other substances capable of forming amino resins, for example urea, urea derivatives, tranzines, toluenesulfonamides, other reactive compounds such as mono- or polyhydric alcohols, amines, water-soluble lactams, aliphatic and aromatic aldehydes and acetals, and they may also contain conventionl additives such as dyes, etc. A preferred additive is caprolactam, as described in German published application No. 1,595,368.

Melamine, formaldehyde and any other additional substances as described above are condensed or subsequently added to the condensate solution, as the case may be, in such amounts that aquoues resin solutions having a solids content of from 30 to 70% and preferably from 50 to 60% are produced.

The aqueous resin solution may be adjusted to such a resin content that when from 1 to 20% and in particular from 3 to 10% by weight of one of the fatty acid dialkyl amides proposed by the invention, for example dimethyl formamide, dimethyl acetamide, dimethyl propionamide, methyl ethyl formamide and diethyl formamide, is added, the resulting solution has a solids content of from 30 to 70% preferably from 50 to 60% by weight. The impregnating resin solutions modified in accordance with the present invention are suitable for impregnating carrier materials such as are used in the manufacture of laminates and, in particular, in forming surface coatings on wood and wood-base materials. Particularly suitable carrier materials are absorbent papers. Our impregnating resin solutions are also suitable for the manufacture of melaine/formaldehyde molding compositions of redcued proneness to crack-formation.

Manufacture of impregnated carrier materials using impregnating resin solutions of the invention is no different from the prior art and it is therefore unecessary to give a detailed descripton thereof in this specification. Suitable technical instructions for the manufacture of resin-impregnated papers may be found, for example, in the article "MOderne Beschichtungsverfahren fur Holzwerkstoffplatten" by Walter Enzensberger in the monograph "Holtz als Roh- und Werkstoff", Vol. 27 pp. 441 to 464 (1969).

When papers impregnated with the resins manufactured in accordance with the present invention are processed, the said resins show a flowability increased to such an extend that it is possible to use pressures of as little as 15 to 20 kg/cm² so that no damage is caused to the substrate.

Furthermore, the elasticity of surfaces prepared with the use of resins of the invention is increased to such an extent that the formation of cracks due to environmental stresses is greatly reduced. The surfaces show good gloss.

In a special embodiment of the invention, ε-aminocaprolactam is used as modifying agent in an amount of from 1 to 10% by weight (based on the melamine/formaldehyde condensate) in addition to the acid amide. Resins thus modified have such excellent flow properties that the coating temperature may be selected within a wide range of from 130° to 200° C. Thus it is possible to apply pressure to the resin either under mild conditions for a relatively long period or at a higher temperatures for a relatively short period without producing differences in the brilliance and clarity of the surfaces thus obtained. No cracks form in said surfaces even when they are overcured.

The improved flow properties also make it possible to effect processing with very short pressing times, since continuous sufaces are obtained even at high curing rates.

In the following Examples the parts and percentages are by weight unless otherwise stated.

EXAMPLE 1

Surfacing chipboard 50 parts of a commercial melamine resin powder obtained by condensing 126 parts of melamine with 162 parts of 37% aqueous formaldehyde solution followed by spray-drying are dissolved in 50 parts of water and 5 parts of dimethyl formamide are added. To the resulting solution there is added sufficient 10% formic acid to cause a sample of the resin (about 1 g) to gel in 2 minutes when heated in a pressure tube on an oil bath at 140° C. This impregnating resin solution is used to impregnate a decorative paper weighing about 110 g/m² and drying is effected at from 130° to 150° C to such an extent that further drying for 5 minutes at 160° C causes a loss of weight of about 5%. The decorative paper should contain about 130% of its weight of resin after drying. Papers impregnated in this manner are placed one on each side of a sanded chipboard panel and the assembly is pressed between chrimium-plated pressure plates for 10 minutes at 140° C under a pressure of 20 kg/cm². This pressure is maintained during cooling to about 50° C, whereupon the assembly is removed from the press.

For the purposes of comparison, the test is repeated but using the resin without additive.

The chipboard panels thus obtained are treated at 70° C for 20 hours in a drying cabinet provided with air circulating means.

Under these conditions, the well cured surfaces obtained with the resin solutions containing dimethyl formamide remain free from cracks, whereas the surfaces of those panels coated with papers containing pure melamine resin show a large number of cracks.

EXAMPLE 2

Surfacing chipboard 100 parts of an aqueous resin solution obtained by condensing 126 parts of melamine with 148 parts of 37% formaldehyde solution and modified by the addition of 10 parts of caprolactam before the commencement of condensation and 6.7 parts of o/p-toluene-sulfon-amides on completion of condensation and having a dry content of about 54% are mixed with 2.7 parts of dimethyl formamide and then further processed as described in Example 1 but with different pressing times. As a control, the test is repeated except that the addition proposed by the invention is omitted.

The panels of chipboard thus obtained are treated at 70° C for 20 hours in a drying cabinet equipped with air circulating means.

| Pressing time at 140° C and 20 kg/cm² (min) | Curing results | Crack formation |
| --- | --- | --- |
| 2 | slightly cured | none |
| 6 | well cured | none |
| 10 | very well cured | none |
| 20 | overcured | none |

A paper impregnated with the same resin but not containing dimethyl formamide shows marked cracking after a pressing time of only 6 minutes when treated in the same manner.

Other tests carried out on the panels which had been pressed for 10 minutes gave the following results:

| Test | Remarks |
| --- | --- |
| Steam test (DIN 53,799) | slight loss of gloss |
| Yellowing at elevated temperature*) | slight yellowing - no blisters |
| Hot pot test (DIN 53,799) | slight loss of gloss |

*)The flat end face of a steel ram heated at 225° C is applied to the test object at a pressure of 30 kg/cm² for 2 minutes, whereupon the specimen is examined for blisters and yellowing.

EXAMPLE 3

Example 2 is repeated except that 2.7 parts of dimethyl acetamide are used in place of 2.7 of dimethyl formamide.

Using the test conditions described in Example 2, very satisfactory results are obtained.

EXAMPLE 4

The resin mixture described in Example 2 is mixed with magnesium chloride to give a gelling time of 90 seconds in a pressure tube at 140° C and is used for impregnating a paper as described in Example 1, whereupon the impregnated paper is dried and applied to chipboard under a pressure of 20 kg/cm² for 30 seconds between pressure plates heated at 160° C. The resulting surfaces show no cracks when treated in the manner described in Example 2.

For purposes of comparison, this test is repeated but without the use of dimethyl formamide in the resin. The resulting surfaces show distinct cracking after the heat treatment.

EXAMPLE 5

126 parts of melamine, 148 parts of 37% aqoues formaldehyde solution, 10 parts of ε-caprolactam, 9.2 parts of dimethyl formamdie and 72 parts of water, are stirred together, and the resulting suspension is heated to 95° C and adjusted to pH 8.6 with aquoues caustic potash or caustic soda solution. This pH is held constant by continuous addition of caustic solution and the reaction mixture is held at the said temperature until resin can be precipitated from a sample by adding from 1.2 to 1.5 times its weight of water at 20° C. The temperature is then lowered to 70° and 6.7 parts of p-toluene-solfonamide are added. When this is completely dissolved, the mixture is cooled to room temperature and the resulting resin solution is adjusted to pH 9–10.

There is obtained a water-clear solution having a viscosity of from 50 to 60 centipoises.

The resin is processed further as described in Example 1 and the results of the tests are similar to those found in Examples 1.

EXAMPLE 6

A suspension containing 126 parts of melamine, 148 parts of aquoeus formaldehyde solution, 10 parts of ε-caprolactam and 72 parts of water is heated to 95° C and adjusted to pH 8.6 by the addition of aqueous caustic potash or caustic soda solution. This pH is held constant by the continuous addition of caustic solution and the reaction mixture is condensed at the said temperature with stirring until resin can be precipitated from a sample by adding from 2 to 2.5 times its weight of water at 20° C. 9.2 parts of dimethyl formamide are then added and condensation is continued until resin can be precipitated from a sample by adding from 1.2 to 1.5 times its weight of water at 20° C. The reaction temperature is then lowered to b 70° C and 6.7 parts of p-toluenesulfonamide are added. When this has dissolved completely, the resulting resin solution is cooled to room temperature and adjusted to pH 9–10.

There is obtained a water-clear solution having a viscosity of from 50 to 60 centipoises.

The resin is processed further and applied to chipboard as described in Example 1 and the results of test are similar to those found in Example 1.

EXAMPLE 7

The resin mixture described in Example 3 is adjusted with magnesium chloride to a gelling time in a pressure tube at 140° C of 90 seconds, used to impregnate paper as described in Example 1 and then dried and applied to chipboard under a pressure of 20 kg/cm² for 30 seconds between pressure plates heated at 160° C. The resulting surfaces show no cracks after tempering (cf. Example 3).

For purposes of comparison, this experiment is repeated except that no dimethyl formamide is included in the resin. The resulting surfaces show distinct cracking after the heat treatment.

We claim:

1. In a process for the manufacture of impregnating resins based on precondensates of melamine and formaldehyde, wherein melamine and formaldehyde are condensed at a molar ratio of melamine to formaldehyde of from 1:1.6 to 1:6 in aqueous solution, the improvement comprising the addition of a fatty acid dialkyl amide which is soluble in the aqueous impregnating resin solution and has the formula

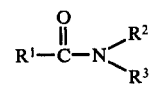

where $R^1$ is hydrogen or lower alkyl and $R^2$ and $R^3$ are alkyl of from 1 to 4 carbon atoms, to the aqueous solution before, during or after condensation in an amount of from 1 to 20% by weight, based on the melamine/formaldehyde precondensate content of the aqueous solution.

2. A process as claimed in claim 1, wherein an amide of the general formula stated in claim 1 in which $R^1$ is alkyl of from 1 to 4 carbon atoms is used.

3. An aqueous impregnating resin solution which comprisis: a precondensate of melamine and formaldehyde at a molar ratio of from 1:1.6 to 1:6; and a soluble fatty acid dialkyl amide of the formula

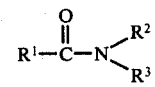

where $R^1$ is hydrogen or lower alkyl and $R^2$ and $R^3$ are alkyl of from 1 to 4 carbon atoms, the amount of said amide being from 1 to 20% by weight based on the melamine/formaldehyde precondensate content of the aquoues solution, the solids content of said aqueous solution being from about 30 to 70% by weight.

4. A resin solution as set forth in claim 3 wherein the amount of said amide is from 3 to 10% by weight based on the melamine/formaldehyde precondensate content of the aqueous solution.

5. A resin solution as set forth in claim 3 wherein the solids content of said solution is from 50 to 60% by weight.

6. A resin solution as set forth in claim 3 wherein the molar ratio of melamine/formaldehyde is 1:6 to 1:3.

* * * * *